United States Patent [19]

Mirville

[11] Patent Number: 5,012,640
[45] Date of Patent: May 7, 1991

[54] COMBINED AIR-HYDROGEN TURBO-ROCKET POWER PLANT

[75] Inventor: Francois J. Mirville, Melun, France

[73] Assignee: Societe Nationale D'etude et de Construction De Moteurs D'Aviation (S.N.E.C.M.A.), Paris, France

[21] Appl. No.: 322,512

[22] Filed: Mar. 13, 1989

[30] Foreign Application Priority Data

Mar. 16, 1988 [FR] France ................... 88 03367

[51] Int. Cl.⁵ .............. F02M 67/00; F02M 2/08; F01D 5/20
[52] U.S. Cl. .......................... 60/246; 60/267; 60/268; 60/270.1; 415/110; 415/173.6; 415/173.7
[58] Field of Search .............. 60/246, 257, 258, 259, 60/260, 267, 268, 270.1, 39.142, 39.162, 39.461; 415/170.1, 173.6, 173.7, 110, 111

[56] References Cited

U.S. PATENT DOCUMENTS

| | | | |
|---|---|---|---|
| 2,883,828 | 4/1959 | Howell | 60/246 |
| 2,941,790 | 6/1960 | Compton et al. | 60/39.142 |
| 2,994,785 | 8/1961 | Mespoulhes | 60/39.142 |
| 3,002,340 | 10/1961 | Landerman | 60/257 |
| 3,145,532 | 8/1964 | Moss | 60/39.142 |
| 3,237,401 | 3/1966 | Peters et al. | 60/260 |
| 3,241,310 | 3/1966 | Hoadley | 60/267 |
| 3,241,311 | 3/1966 | Kuhrt | 60/267 |
| 3,253,406 | 5/1966 | Grieb | 60/262 |
| 3,279,192 | 10/1966 | Hull, Jr. et al. | 60/269 |
| 3,355,890 | 12/1967 | Kappus | 60/262 |
| 3,705,496 | 12/1972 | Wolf et al. | 60/267 |

FOREIGN PATENT DOCUMENTS 2642347 4/1977 Fed. Rep. of Germany ... 60/39.142

*Primary Examiner*—Louis J. Casaregola
*Assistant Examiner*—John A. Savio, III
*Attorney, Agent, or Firm*—Bacon & Thomas

[57] ABSTRACT

A combined air-hydrogen turbo-rocket engine is disclosed having a simplified construction in which the hydrogen driven turbine is formed integrally with the rotor wheel of the axial air compressor stages. The rotor stages are located downstream of a stator vane structure and are driven by gaseous hydrogen passing across the turbine blades. The hydrogen is subsequently injected into an air duct surrounding the axial air compressor and defining an airflow path having an air inlet. The hydrogen-air mixture is ignited and the burned gases are expanded through a converging-diverging exhaust nozzle.

20 Claims, 7 Drawing Sheets

COMBINED AIR-HYDROGEN TURBO-ROCKET POWER PLANT

BACKGROUND OF THE INVENTION

The present invention relates to a combined air-hydrogen turbo-rocket power plant capable of accelerating an aircraft or the like to hypersonic speeds at high altitudes.

French patent No. 2,215,538 describes a power plant of this type in which an axial air compressor is driven by an axial turbine rotated by hydrogen gas. The turbine is coaxially located with respect to the air compressor and is connected to the compressor by a generally axially extending shaft. The hydrogen expanding through the turbine is subsequently injected into an air duct which surrounds the turbine and the compressor, and defines an airflow path. The hydrogen is burned while it is being mixed with the compressed air issuing from the compressor and the mixture of burned gases is exhausted downstream through a diverging exhaust pipe.

While the performance of this known power plant is adequate, the complexity of the device is believed to be unduly high due to the number of compressor stages required to achieve a good air compression ratio and because of the complicated mechanical structure necessitated by the location of the hydrogen-feed turbine in the middle of the airflow duct.

SUMMARY OF THE INVENTION

A combined air-hydrogen turbo-rocket engine is disclosed having a simplified construction in which the hydrogen driven turbine is formed integrally with the rotor wheel blades of the axial air compressor stages. The rotor stages are located downstream of a stator vane structure and are driven by gaseous hydrogen passing across the turbine blades. The hydrogen is subsequently injected into an air duct surrounding the axial air compressor and defining an airflow path having an air inlet. The hydrogen-air mixture is ignited and the burned gases are expanded through a converging-diverging exhaust nozzle.

The hydrogen is supplied to the turbine from a liquid hydrogen reservoir via at least one hydrogen pump with the liquid passing through a heat exchanger to raise the temperature of the hydrogen, thereby causing it to vaporize. The gaseous hydrogen passes into a generally annular-shaped chamber defined around the air duct in the same general plane as the rotor wheel stages of the air compressor to drive the turbine.

The hydrogen pump may be driven by an auxiliary turbine, again powered by gaseous hydrogen, or may be mounted in the hub of the axial air compressor and be driven directly by the compressor rotor wheel.

In the power plant according to the invention, each compressor rotor wheel is driven by at least one axial flow turbine rotor stage located outside the compressed air duct in an annular chamber surrounding the duct.

In alternative embodiments of the invention, more than one turbine rotor blade may be associated with each of the axial compressor rotor blades and the axial compressor may comprise more than one rotor stage. If a plurality of compressor rotor stages are utilized, adjacent stages may rotate in the same direction, or they may rotate in opposite directions depending upon the orientation of the turbine rotor blades.

The multiple stages of the axial compressor may be located in a common annular chamber, or they may be located in separate annular chambers which may be connected to the hydrogen supply system either in parallel or in series.

A starting device may also be incorporated into the power plant according to the invention and may comprise a source of pressurized gas, a conduit connecting the pressurized gas source with one or more of the annular chambers and a valve to control the flow of the pressurized gas through the conduit.

DETAILED DESCRIPTION OF THE PREFERRED EMBODIMENTS

Figure 1:
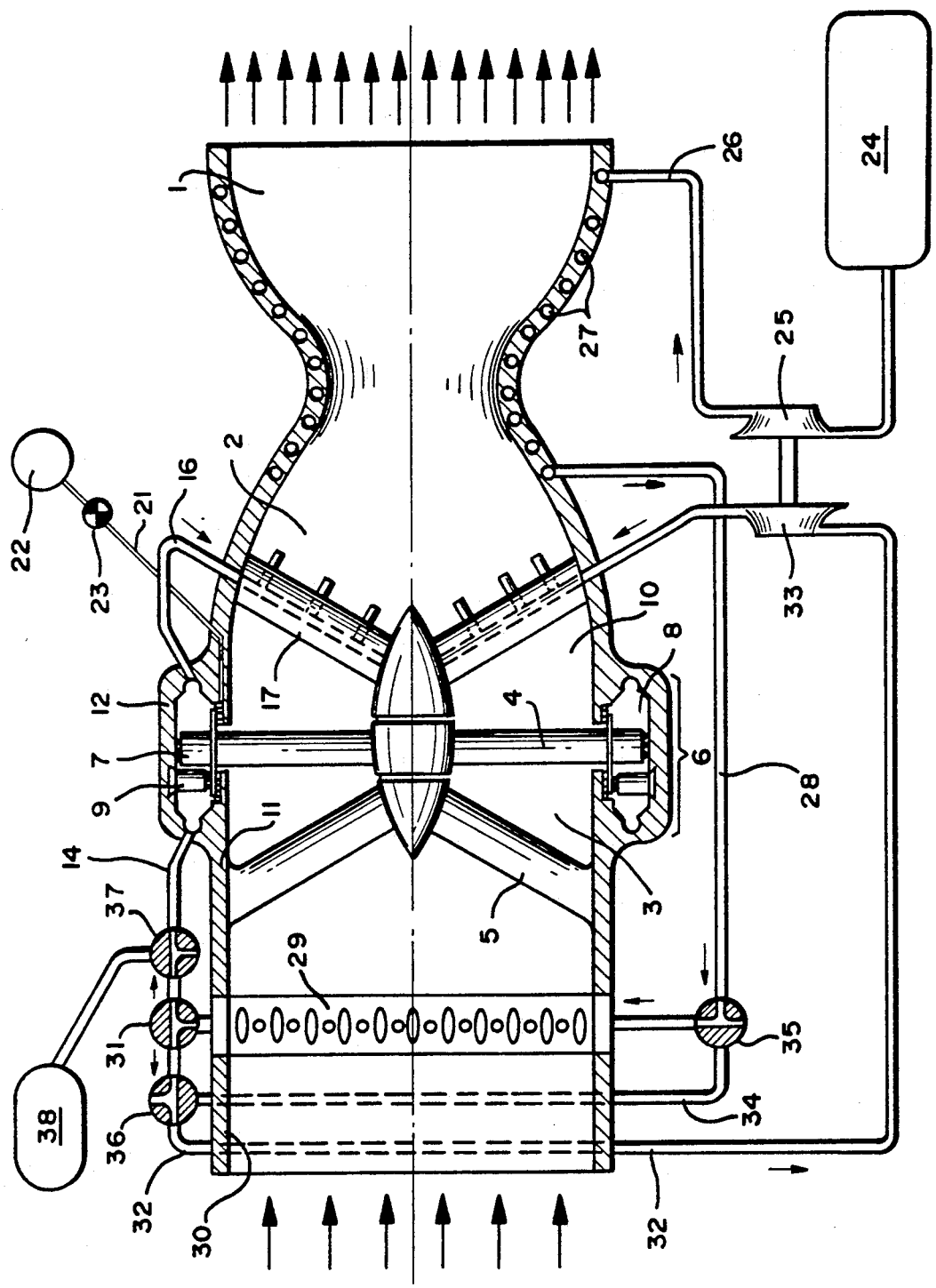
FIG. 1 is a longitudinal sectional view illustrating a first embodiment of the power plant according to the invention.
Figure 2:
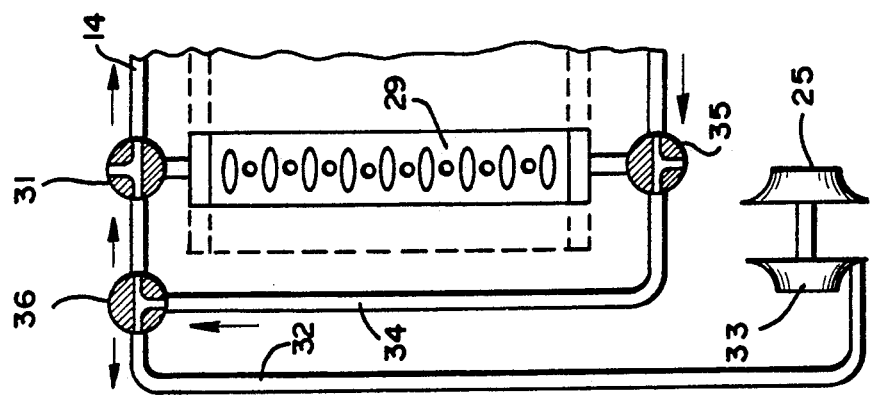
FIG. 2 is a partial, schematic diagram of the heat exchanger bypass circuit associated with the power plant illustrated in FIG. 1.
Figure 3:
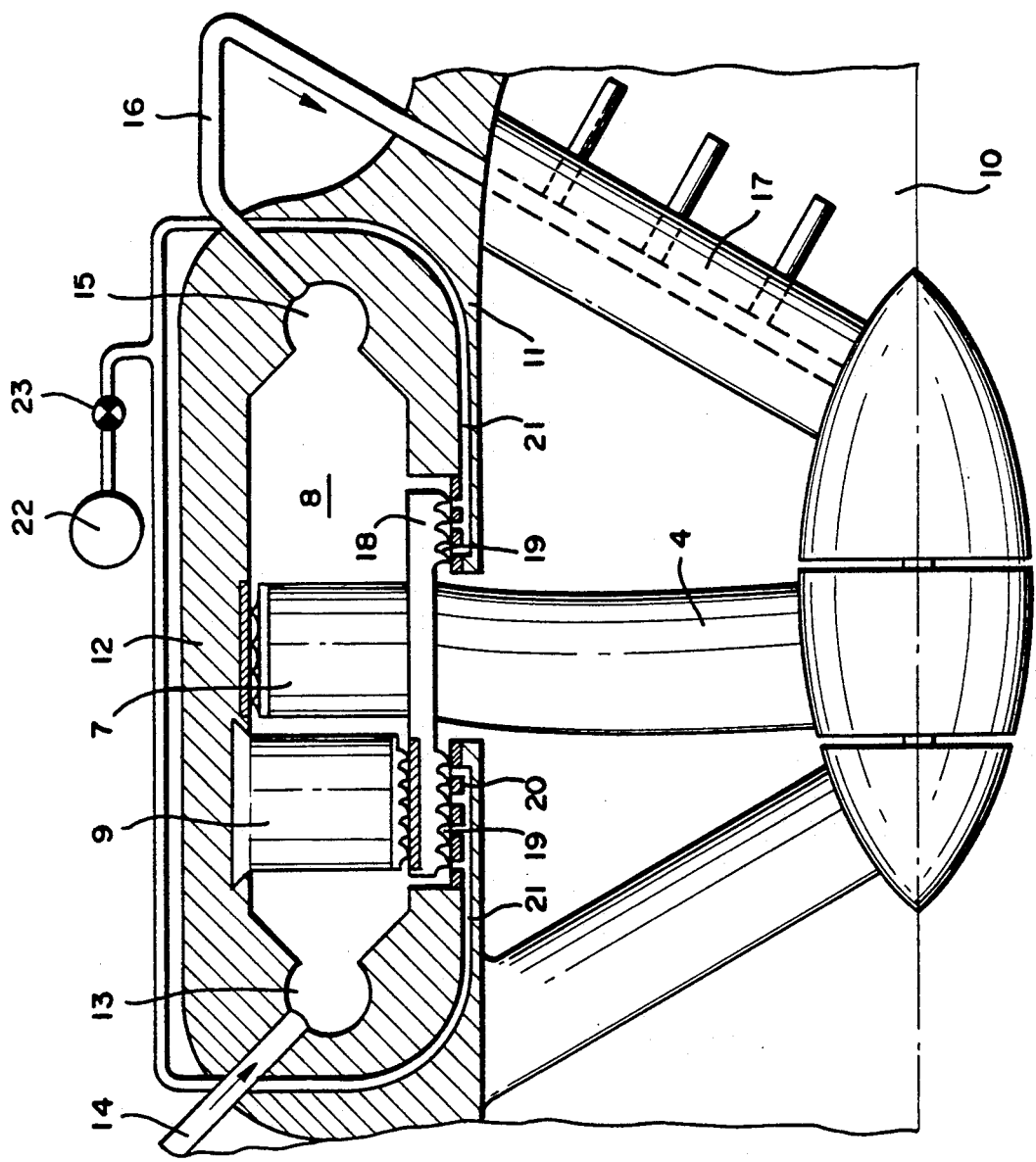
FIG. 3 is an enlarged, cross-sectional view illustrating the annular chamber of the device shown in FIG. 1.

The power plant according to the invention, as illustrated in FIGS. 1-3, comprises a converging-diverging nozzle 1 connected to an air duct casing 11 which defines an air duct 10 and a combustion chamber 2, and surrounds an axial air compressor 3. The air compressor 3 comprises a rotor stage 4 consisting of a rotor wheel having a plurality of rotor blades extending radially therefrom in known fashion. The rotor stage 4 is located downstream of stator guide vane 5 which supports a hub coaxially with the longitudinal axis of the air duct 10 to rotatably support the rotor stage 4. The air duct 10 defines an air intake 30 at its upstream end (the left end as viewed in FIG. 1) for the intake of air to be compressed by the rotation of the rotor stage 4.

The rotor stage 4 is driven by axial turbine assembly 6 which comprises at least one turbine rotor blade 7 formed as an extension of each of the compressor rotor blades. The turbine rotor blades 7 are located in an annular chamber 8 located outside the periphery of the air duct 10 and formed by a portion of the turbine casing 12 and the air duct casing 11. While the axial length of the annular chamber 8 may be greater than that of the rotor stage 4, the annular chamber 8 is located generally in the same plane as that of the rotor stage. The driving turbine also comprises a plurality of stator vanes 9 which may be attached to the turbine casing 12 so as to extend radially inwardly toward the air duct casing 11. The axial turbine blades 7 may be formed integrally with, or may be formed as a separate element and attached to each of the blades of the compressor rotor stage 4.

Hydrogen is supplied to the chamber 8 via supply tube 14 at point 13 upstream up the stator vane 9. After passing over the turbine stator vanes 9 and the turbine blades 7, the expanded hydrogen is withdrawn from chamber 8 at area 15 via exhaust tube 16. Exhaust tube 16 directs the hydrogen to injection tubes 17 to inject the hydrogen into the combustion chamber 2 where it is ignited after mixing with the compressed air.

Since the compressor stage 4 must pass through the casing wall 11 defining air duct 10, seal means must be provided to prevent the hydrogen from chamber 8 from passing into the air duct 10. A seal platform 18 extends between the compressor blades 4 and the turbine blades 7 and extends axially in both directions from the plane of the rotor stage 4. The sealing member 18 is located on the radially outer side of air duct casing 11, but inside the turbine enclosure and defines labyrinth seals 19 which cooperate with abradable material 20 to provide the requisite seal.

To provide additional sealing, inert gas may be directed through the cooperating surfaces of the labyrinth seals 19 and the abradable material 20. A source of pressurized inert gas 22 (which may be an external reservoir holding pressurized helium) stores the inert gas at a pressure significantly higher than either that of the compressed air or the hydrogen. Conduit 21 connects the inert gas source 22 with the area adjacent the labyrinth seals 19 and the abradable material 20, and the flow of the inert gas is controlled by valve 23. By allowing a small flow of inert gas to leak through the juncture of the labyrinth seals 19 and the abradable material 20, leakage of the hydrogen from chamber 8 into the air duct 10 is prevented.

The circuit for supplying hydrogen gas to the supply tube 14 may comprise a reservoir 24 storing liquid hydrogen having an outlet connected to pump 25 which may pump the liquid hydrogen from the reservoir 24 into supply tube 26. Tube 26 is connected to a heat exchanger 27, which may consist of a coil of conduit passing around or through the nozzle 1 so as to absorb the heat of the exhaust gases passing through the nozzle. The temperature of the hydrogen passing through the heat exchanger 27 is raised and the hydrogen is vaporized such that gaseous hydrogen passes through conduit 28 connected to the outlet of the heat exchanger 27. The hydrogen then may pass through a second heat exchanger 29 located adjacent to the intake duct 30 of the air duct 10 to absorb heat from the incoming air so as to further raise its temperature and potential energy, and to improve the compression of the cooled air.

Upon leaving the heat exchanger 29, the hydrogen gas flow may be divided into two portions by a three-way, three-port valve 31. One portion of the hydrogen gas flow is directed to the supply tube 14 and powers the axial turbine in the fashion previously discussed. The other portion of the hydrogen gas flow is directed through tube 32 back to auxiliary turbine 33 which is mechanically connected to and drives the hydrogen pump 25. After its expansion through the auxiliary turbine 33, the hydrogen gas passes into the injection tubes 17 as illustrated in FIG. 1.

Under certain operating conditions, specifically during low altitude ascent and low speed operation, the heat exchanger 29 may be bypassed by allowing the hydrogen to flow through tube 34 and subsequently into supply tubes 14 and 32 as previously discussed. This may be easily achieved, as illustrated in FIG. 2, by valves 35 and 36 which are also three-way, three-port valves with valve 36 providing the same separation of hydrogen flow as valve 31.

A starting system may also be incorporated to provide the initial rotation of the compressor rotor stage 4 and may consist of a reservoir 38 of highly pressurized gas connected to supply tube 14 through valve 37. When the engine is initially at rest, opening the valve 37 to allow the highly pressurized gas to communicate with the chamber 8 will begin rotation of the axial compressor 4 until a sufficient flow of hydrogen can be developed to continue the rotation. As an alternative to the reservoir 38 of highly pressurized gas, a pyrotechnic device may also be utilized which generates gases as a result of combustion to supply the energy required to drive the turbine until the hydrogen circuit is in full operation.

Once the engine has been started, during ground running and low altitude flight (less than 10,000 meters) and at low Mach number operations (less than 2), the heat exchanger 29 is bypassed by positioning the valves 31, 35 and 36 in the positions shown in FIG. 2. In the ensuing flight operations at an altitude of between 10,000 meters and 30,000 meters and at a Mach number of between 2 and 6, the heat exchanger 29 is placed on stream to achieve a gain of the specific impulse of the engine.

Figure 4:
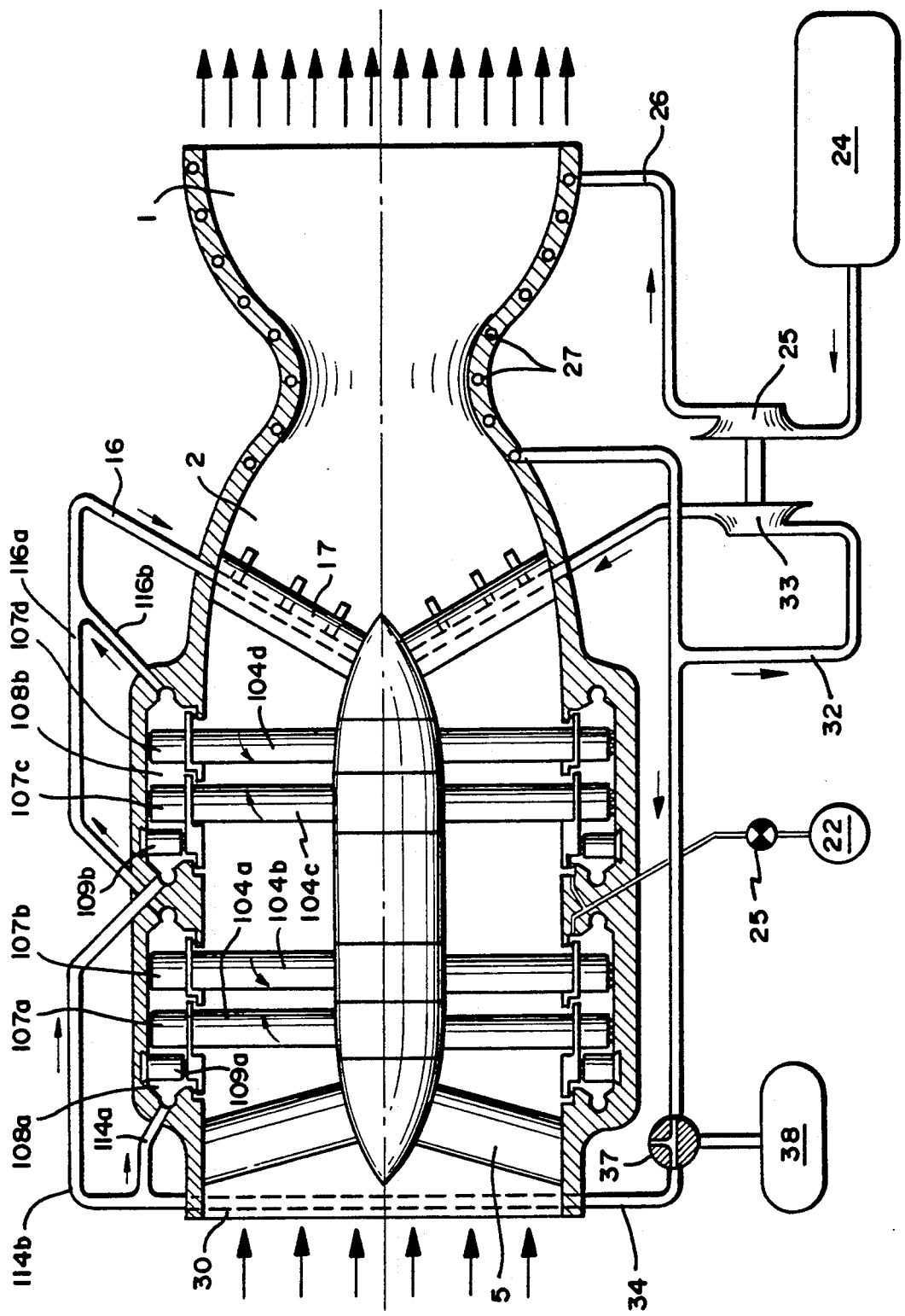
FIG. 4 is a longitudinal cross-sectional view of a second embodiment of the power plant according to the invention.

A second embodiment of the air-hydrogen turbo-rocket engine is illustrated in FIG. 4. In this embodiment, an axial compressor having four rotor wheels or stages is utilized, with the rotor stages forming counter-rotating pairs 104a, 104b and 104c, 104d, respectively. In this figure, all of the components identical to those of the preceding embodiments are the same whereas modified components are denoted by numerals increased by 100. In this embodiment, the hydrogen supply circuit is similar to that of the embodiment illustrated in FIG. 1, except that heat exchanger 29 adjacent to the air intake 30 has been completely deleted. The counter-rotating pairs of axial turbine blades 107a, 107b and 107c, 107d, respectively, are located in separate annular chambers 108a and 108b. The annular chambers are connected to the hydrogen supply tubes 114a and 114b in parallel. Stator vanes 109a and 109b direct the flow of hydrogen over the axial turbine blades in the same manner as the previously described embodiment. The hydrogen is withdrawn from the chambers 108a and 108b by exhaust tubes 116a and 116b, respectively.

In this embodiment, the absence of the heat exchanger in the air intake duct 30, which results in a lesser potential energy of the hydrogen than in the previous embodiment, is compensated for by the presence of two power turbines operating in parallel and driving four axial compressor rotor stages. The parallel arrangement for the hydrogen supply is possible if there is a high flow, but relatively low pressure of hydrogen at the discharge of the heat exchanger 27. In spite of the lower speed of rotation, the greater number of rotor stages achieves the same compression ratio as the previously described embodiment.

Figure 5:
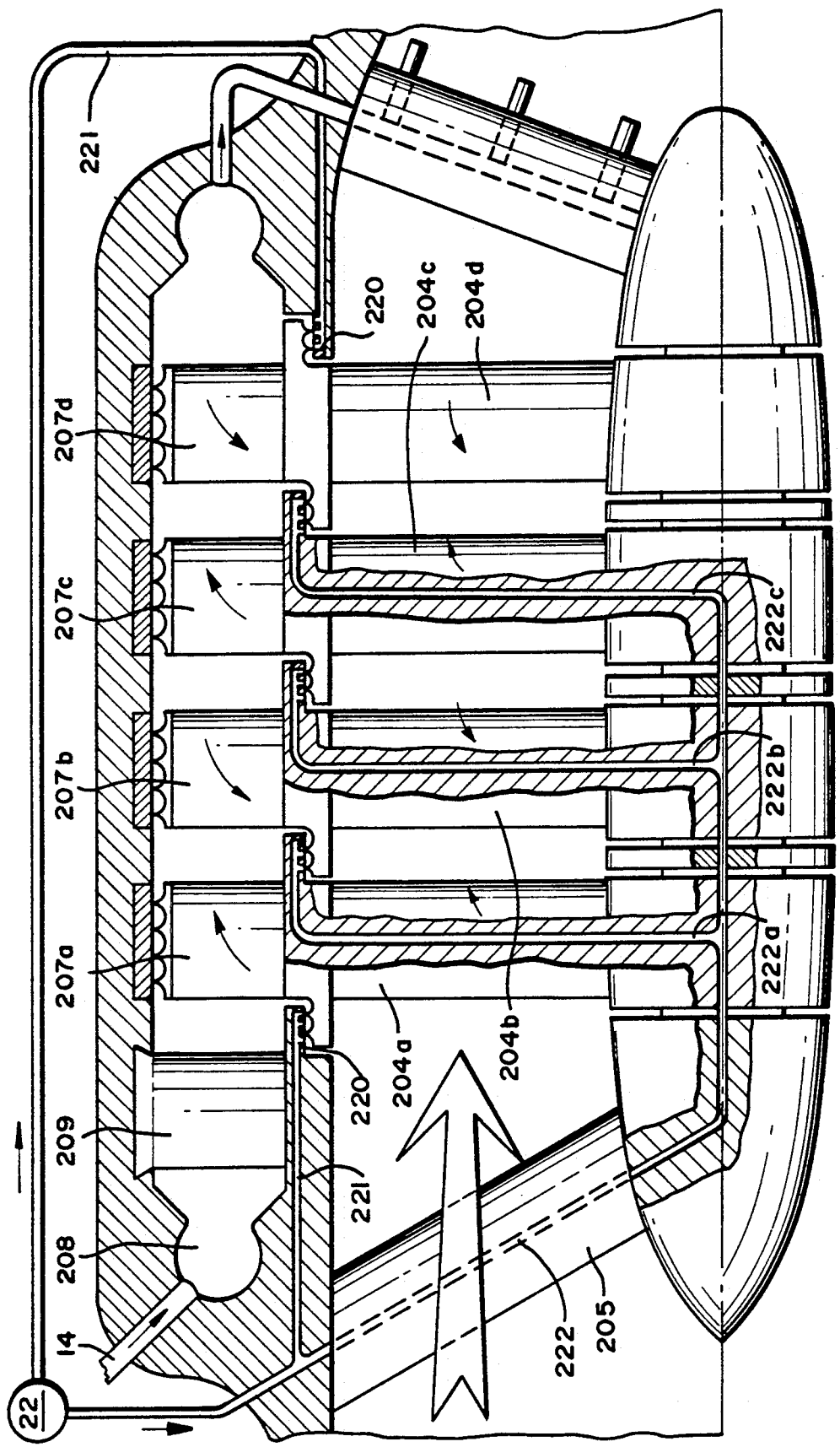
FIG. 5 is an enlarged, cross-sectional view of a third embodiment of the invention illustrating counter-rotating compressor stages in a common annular chamber.

FIG. 5 illustrates a variation of the embodiment in FIG. 4 in which the two pairs of turbine blades on the counter-rotating compressor stages are located in the same annular chamber such that the driving turbines are supplied hydrogen in series. In this embodiment, the rotor stages 204a-204d are driven by the axial turbine blades 207a-207d, respectively and each of the turbine blades are located in annular chamber 208. Hydrogen enters the chamber 208 via the supply tube 14 and, after passing over the stator vanes 209, passes over each of the turbine blades 207a-207d before exiting the annular chamber.

The series arrangement is applicable to those situations in which a low flow rate, but high pressure hydrogen is present at the discharge of heat exchanger 27. The series arrangement achieves a higher specific impulse than does the corresponding parallel feed arrangement because of the low flow of hydrogen, but requires a hydrogen pump with a higher pressure ratio and higher performance sealing. Accordingly, a more complex inert gas sealing circuit may be called for in this embodiment which may comprise, in addition to the direct feeds 221 to labyrinth seals 220 of the first and last stages, a parallel feed of inert gas to the inter-rotor seals. This may be implemented by tube 222 passing through one of the stator vanes 205 and into the central compressor shaft and subsequently splitting off into individual conduits 222a, 222b and 222c passing through the respective compressor rotor blades. These conduits direct the inert gas onto the blade sealing members between the respective adjacent compressor stages.

Figure 6:
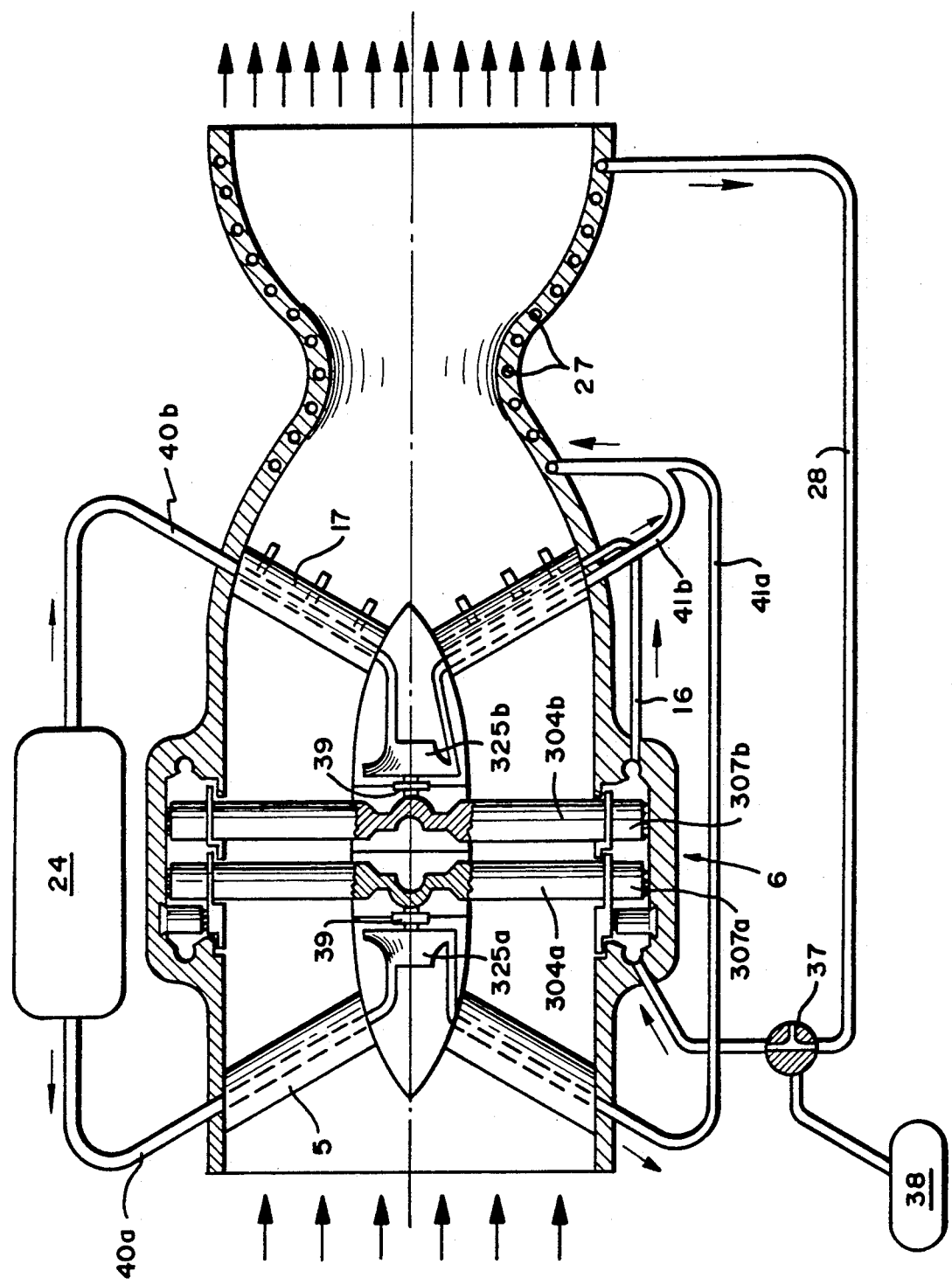
FIG. 6 is a longitudinal, cross-sectional view of a fourth embodiment of the power plant according to the invention.

In the alternative embodiment shown in FIG. 6, the axial compressor comprises a single pair of counter-rotating compressor rotor wheels and utilizes the rotation of each of the compressor rotors to drive internal hydrogen pumps. In this instance, liquid hydrogen pumps 325a and 325b are located in the hub which rotatably supports each of the rotors. Step-up gear units 39 interconnect each of the liquid hydrogen pumps with a rotor wheel to assure adequate rotational speed of the hydrogen pumps.

Conduits 40a and 40b feed the liquid hydrogen from the reservoir 24 into the hydrogen pumps 325a and 325b through the radial arms of the intake stator vane 5 and those supporting the hydrogen injection tubes 17. At the pump outputs, hydrogen circuits 41a and 41b merge upstream of the heat exchanger 27 to supply the hydrogen to the heat exchanger. Thereafter, conduit 28 directs the gaseous hydrogen to the intake of the drive turbine 6 such that the gas passes over the turbine blades 307a and 307b in series. The exhaust from the annular chamber is the same as that in previous embodiments and directs the expanded hydrogen to the injection tubes 17.

Figure 7:
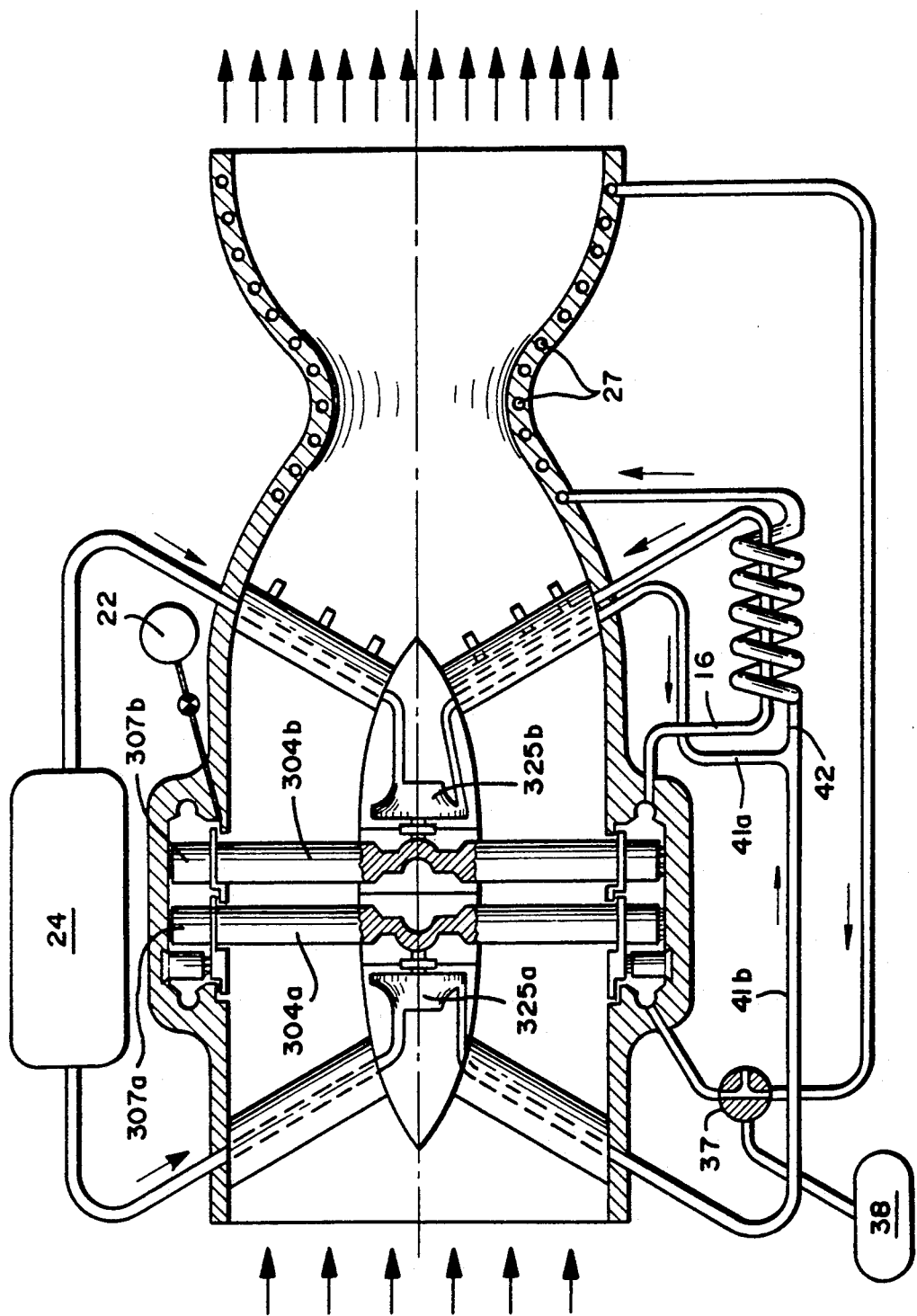
FIG. 7 is a longitudinal, cross-sectional view of a modification of the power plant shown in FIG. 6 incorporating a second heat exchanger.

In the variation of the embodiment shown in FIG. 6 illustrated in FIG. 7, the hydrogen supply circuit has been supplemented by a second heat exchanger. In this variation, the output tubes 41a and 41b of the hydrogen pumps 325a and 325b merge into a single conduit 42 which is coiled around the tube 16 directing the hydrogen from the drive turbine toward the injection tubes 17. Accordingly, the liquid hydrogen leaving the pumps absorbs heat from the hydrogen issuing from the drive turbine before passing into the second heat exchanger 27. This design variation increases the available hydrogen energy at the turbine intake and recovers higher power from the turbine. The power of the hydrogen pumps can be increased, thereby increasing the pressure in the main chamber, thereby increasing the specific impulse of the power plant.

Figure 8:
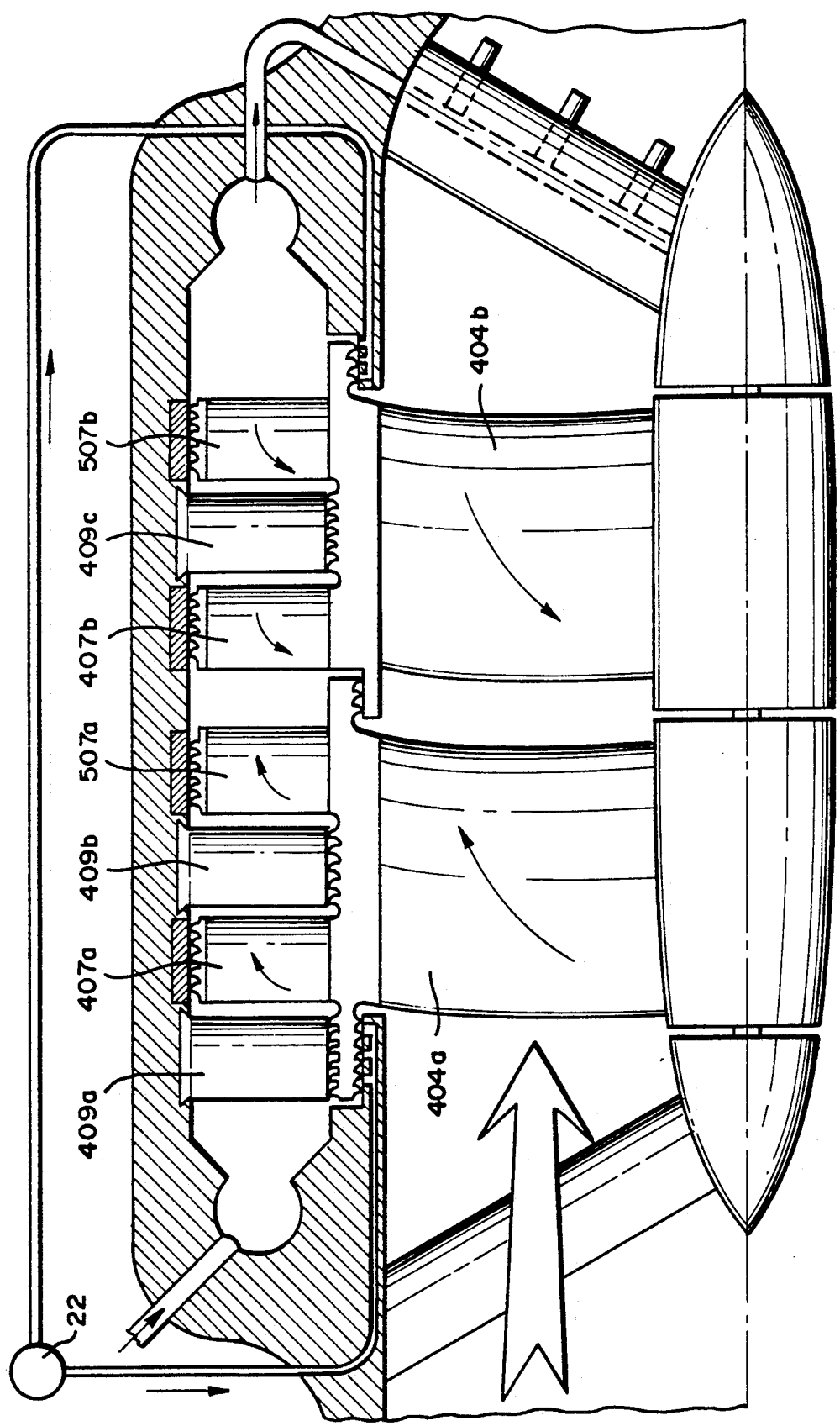
FIG. 8 is an enlarged, cross-sectional view illustrating a fifth embodiment of the power plant according to the present invention.

Although the various embodiments of the power plant according to the invention have been thus far described as incorporating a single axial turbine blade for each blade of the compressor rotor stage, more than one drive turbine blade can be utilized, as illustrated in FIG. 8. In this embodiment, two axial turbine blades are utilized for each of the compressor rotor blades. Turbine blades 407a and 507a are formed with compressor rotor blade 404a, while turbine blades 407b and 507b are formed integrally with compressor rotor blade 404b. Additional stator vanes 409b and 409c are also utilized in addition to the upstream stator vane 409a. As can be seen, vane 409b extends between turbine blades 407a and 507a, while stator vane 409c extends between turbine blades 407b and 507b. No stator vanes are necessary between adjacent turbine blades 507a and 407b due to their opposite rotational directions.

The foregoing description is provided for illustrative purposes only and should not be construed as in any way limiting this invention, the scope of which is defined solely by the appended claims.

I claim:

1. An airbreathing, liquid hydrogen turbo-rocket engine comprising:
   (a) an air duct defining an air intake;
   (b) an axial air compressor having at least one pair of compressor rotor stages, each having a rotor stage wheel with a plurality of compressor blades disposed within the air duct;
   (c) nozzle means operatively associated with the air duct to exhaust gases therefrom;
   (d) means defining at least one annular chamber extending around the air duct in the plane of the rotor stages;
   (e) turbine means disposed in the at least one annular chamber comprising:
     (i) at least one durbine stator vane stage; and,
     (ii) at least one turbine rotor blade stage with at least one turbine blade operatively associated with each of the compressor blades of each of the compressor stages such that rotation of the turbine rotor stages causes rotation of the at least one pair of compressor rotor stages;
   (f) a source of hydrogen;
   (g) pump means to pump the hydrogen from the source into the annular chamber so as to rotate the turbine rotor stage; and,
   (h) exhaust means to exhaust hydrogen from the annular chamber into the air duct.

2. The turbo-rocket engine according to claim 1 further comprising a heat exchange means interposed between the hydrogen source and the annular chamber to raise the temperature of the hydrogen before entering the annular chamber.

3. The turbo-rocket engine according to claim 2 wherein the heat exchange means comprises a heat exchange coil disposed around the nozzle means to absorb heat therefrom.

4. The turbo-rocket engine according to claim 2 wherein the heat exchange means comprises:
   (a) a first heat exchange means; and,
   (b) a second heat exchange means disposed between the first heat exchange means and the annular chamber to further raise the temperature of the hydrogen before entering the annular chamber.

5. The turbo-rocket engine according to claim 4 wherein the first heat exchange means comprises a heat exchange coil disposed around the nozzle means to absorb heat therefrom.

6. The turbo-rocket engine according to claim 4 wherein the second heat exchange means comprises a heat exchange coil disposed around the nozzle means to absorb heat therefrom.

7. The turbo-rocket engine according to claim 1 further comprising seal means between the compressor blades and the annular chamber to prevent hydrogen from entering the air duct at this location.

8. The turbo-rocket engine according to claim 7 wherein the seal means comprises:
   (a) a labyrinth seal platform extending axially from the compressor blade; and
   (b) an abradable sealing ring on the air duct contacting the labyrinth seal platform.

9. The turbo-rocket engine according to claim 8 further comprising;
   (a) a source of inert gas; and,
   (b) means connected to the inert gas source to direct the gas between the labyrinth seal platform and the abradable sealing ring.

10. The turbo-rocket engine according to claim 1 further comprising an auxiliary turbine drivingly connected to the pump means.

11. The turbo-rocket engine according to claim 1 further comprising hub means located approximately coincident with a longitudinal axis of the air duct to rotatably support the at pair of compressor rotor stage wheel.

12. The turbo-rocket engine according to claim 11 wherein the pump means is located in the hub means and further comprising means connecting the pump means to the at pair of compressor rotor stage wheel such that rotation of the compressor rotor wheel drives the pump means.

13. The turbo-rocket engine according to claim 1 wherein the turbine blades associated with each compressor rotor stage are oriented such that the compressor rotor stages rotate in opposite directions.

14. The turbo-rocket engine according to claim 1 comprising means to define a separate annular chamber for each pair of compressor rotor stages.

15. The turbo-rocket engine according to claim 14 further comprising conduit means connecting the annular chambers to the pump means in parallel.

16. The turbo-rocket engine according to claim 14 further comprising conduit means connecting the annular chambers to the pump means in series.

17. The turbo-rocket engine according to claim 1 wherein the turbine means further comprises:
   (a) at least two turbine blades operatively associated with each compressor rotor blade; and,
   (b) at least two turbine stator stages.

18. The turbo-rocket engine according to claim 1 further comprising starting means communicating with the at least one annular chamber to start rotation of the air compressor stage.

19. The turbo-rocket engine according to claim 17 wherein the starting means comprises:
   (a) a source of pressurized gas;
   (b) conduit means connecting the pressurized gas source to the at least one annular chamber; and,
   (c) valve means in the conduit means for controlling the flow of pressurized gas through the conduit into the annular chamber.

20. The turbo-rocket engine according to claim 19 wherein the source of pressurized gas comprises a pyrotechnical device.

* * * * *